United States Patent
Batten et al.

(10) Patent No.: US 6,725,405 B2
(45) Date of Patent: Apr. 20, 2004

(54) APPARATUS AND METHOD FOR PROVIDING A DIAGNOSTIC PROBLEM DETERMINATION METHODOLOGY FOR COMPLEX SYSTEMS

(75) Inventors: Pamela Ann Batten, Buda, TX (US); Douglas Marvin Benignus, Dime Box, TX (US); Arthur James Tysor, Buda, TX (US)

(73) Assignee: International Business Machines Corporation, Armonk, NY (US)

( * ) Notice: Subject to any disclaimer, the term of this patent is extended or adjusted under 35 U.S.C. 154(b) by 574 days.

(21) Appl. No.: 09/810,056

(22) Filed: Mar. 15, 2001

(65) Prior Publication Data

US 2002/0133766 A1 Sep. 19, 2002

(51) Int. Cl.[7] .......................... G01R 31/28; H02H 3/05
(52) U.S. Cl. ............................ 714/724; 714/31; 714/46
(58) Field of Search ................................ 714/724, 725, 714/799, 718, 3, 2, 9, 10, 11, 25, 26, 31, 32, 33, 37, 43, 46, 48, 57

(56) References Cited

U.S. PATENT DOCUMENTS

| | | | | |
|---|---|---|---|---|
| 5,808,919 A | * | 9/1998 | Preist et al. | 702/183 |
| 5,922,079 A | * | 7/1999 | Booth et al. | 714/26 |
| 6,141,780 A | * | 10/2000 | Lee | 714/718 |
| 6,189,114 B1 | * | 2/2001 | Orr | 714/25 |

* cited by examiner

*Primary Examiner*—Christine T. Tu
(74) *Attorney, Agent, or Firm*—Duke W. Yee; Volel Emile; Stephen J. Walder, Jr.

(57) ABSTRACT

An apparatus and method for performing a diagnostic problem determination methodology for complex systems is provided. With the apparatus and method, a diagnostic application for a system may automatically invoke additional diagnostics for child devices and/or siblings of the child devices based on status of the child devices after testing the parent device. This allows for complete testing of a subsystem in a single diagnostic execution resulting in a more complete, accurate analysis of subsystems with complex configurations such as seen with redundant arrays of independent disk drive (RAID) systems.

31 Claims, 3 Drawing Sheets

APPARATUS AND METHOD FOR PROVIDING A DIAGNOSTIC PROBLEM DETERMINATION METHODOLOGY FOR COMPLEX SYSTEMS

BACKGROUND OF THE INVENTION

1. Technical Field

The present invention is directed to an improved data processing system. More specifically, the present invention is directed to an apparatus and method for providing a diagnostic problem determination methodology for complex systems.

2. Description of Related Art

Current methods used by diagnostic devices for reporting errors typically report an indeterminate error code when testing a parent device by simply stating that a child device could not be restored to its original state. A parent device is a device that has child devices coupled to it or incorporated into it. For example, a parent device may be a computer system and child devices of this parent device may be a network interface card, a video card, a scanner, a printer, a computer subsystem, or the like.

The indeterminate error code returned by the diagnostic device does not pinpoint the problem accurately, forcing the technician to spend additional time analyzing the problem and possibly making the wrong Field Replaceable Unit (FRU) replacement. A FRU is a unit that may be replaced by a technician in the field. Such FRUs may be, for example, child devices of the parent device (the computer system under test).

Thus, the known systems for diagnosing faults have the drawbacks that a technician is required to spend large amounts of time to analyze the problem encountered by a system in view of the indeterminate error and that the technician may replace FRUs that either are the incorrect FRUs to replace or may result in an entire FRU being replaced when, in actuality, only a component of the FRU need be replaced to solve the problem. Such drawbacks result in greater down time for the system and more expensive repairs.

Because current diagnostic devices are unable to accurately pinpoint the problem being experienced by the system under test, an improved methodology is needed for identifying the source of a system problem with particularity.

SUMMARY OF THE INVENTION

The present invention is directed to an apparatus and method for performing a diagnostic problem determination methodology for complex systems. The present invention provides an apparatus and method whereby a diagnostic application for a system may automatically invoke additional diagnostics for child devices and/or siblings of the child devices based on status of the child devices after testing the parent device. This allows for complete testing of a subsystem in a single, automatic, diagnostic execution resulting in a more complete, accurate analysis of subsystems with complex configurations such as seen with redundant arrays of independent disk drive (RAID) systems.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
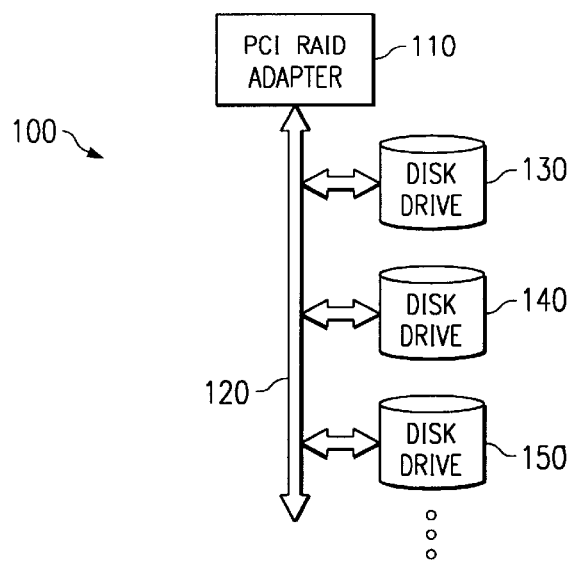
FIG. 1 is an exemplary block diagram of a parent/child device system in accordance with the present invention.

FIG. 1 is an exemplary block diagram of a parent/child device system in accordance with the present invention. The particular system shown in FIG. 1 is a redundant array of independent disk drive (RAID) system in which a plurality of disk drives are coupled together to form a bank of disk drives that are accessible through an adapter and a bus. With a RAID system, the bank of disk drives appears to a client device to be a single virtual disk drive, while in actuality data is stored across each disk drive. While the present invention will be described with reference to a RAID system, the present invention is not limited to such a system. Rather, the present invention may be applied to any system having a parent device/child device configuration.

As shown in FIG. 1, the RAID system 100 includes a peripheral component interface (PCI) RAID adapter 110 coupled to a SCSI bus 120, which may also be a Fibre channel, PCI bus, or the like, without departing from the spirit and scope of the present invention. Also coupled to the SCSI bus 120 is a plurality of disk drives 130–150. A client device may read/write data from and to the disk drives 130–150 via the PCI RAID adapter 110 and PCI bus 120. While the system shown in FIG. 1 includes a PCI bus 120 and a PCI RAID adapter 110, the invention is not limited to any particular parent/child device system architecture and any architecture may be used without departing from the spirit and scope of the present invention.

In prior art diagnostic methodologies, a diagnostic procedure is applied to the PCI RAID adapter 120. The diagnostic procedure will typically cause the disk drives 130–150 to be unconfigured, i.e. all applications using these devices are stopped. If, during the diagnostic procedure, one or more of the disk drives 130–150 is unable to be restored to its original state, an indeterminate error code is returned by the diagnostic procedure. This indeterminate error code does not provide any indication as to which of the parent or the child devices is the source of the problem encountered.

Because of the indeterminate error code, the technician is typically forced to decide which tests to apply to which ones of the child devices to try and isolate the problem. That is, based on the symptoms diagnosed, the technician must guess which part of the subsystem to test. Depending on what the technician decides to test, he/she could potentially select a device that would give misleading information as to the cause of the problem. Moreover, he could inadvertently mask or destroy the essential data needed to identify the underlying cause.

After the technician finishes testing all the elements of the subsystem that he/she thinks should be tested, he/she now has to take the individual results and put them together to make a complete picture of the status of the system. This means that the technician must have an in-depth knowledge of how the diagnostics work and the possible impact that each of the tests might have had on the subsequent tests. Few technicians have this type of understanding of the underlying diagnostic tests. In addition, this means that there is a higher likelihood that the technician may make the wrong decision as to which units, e.g., Field Replaceable Units (FRUs), to replace. Moreover, even if the technician chooses the right FRU to replace, the technician may end up replacing an entire unit when only a component of the unit need be replaced to solve the system fault.

The present invention provides an automated mechanism for isolating the source of a system problem. With the present invention, a technician need only select a top-most device of the subsystem relating to the perceived problem. Then, on a single, automatic execution, all pertinent information is gathered and a determination is made as to which child devices needed to be tested to isolate the cause of the problem. In particular, the present invention unconfigures the child devices of a subsystem that is suspected to have caused a fault in the system. Diagnostic procedures are then performed on the parent device to determine if there is a fault in the parent device.

If the parent device is not faulty, attempts are made to restore the child devices to their original state. If a child device cannot be restored to its original state, diagnostic tests are performed on that child device. At this point, the child device is regarded as the parent device for any other child devices coupled to this child device. The process is then automatically repeated for each child device, and any child devices thereof, that are unable to be recovered to their original state. In this way, the diagnostic testing procedure is stepped through the "tree" of child devices of a system and/or subsystem to identify devices that are faulty and potentially the cause of the system problem.

As an example of how the present invention operates on a parent/child device system, consider again the RAID system 100 of FIG. 1. In order to fully test the PCI RAID adapter 110, the adapter and all its children must be taken off-line from the rest of the operating system. Assume that the problem that was reported by the customer was that the disk subsystem was losing data. This could be caused by one or the child devices, i.e. one of the disk drives 130–150, but it is necessary to determine which one.

When the technician runs problem determination procedures on the PCI RAID adapter 110 controlling the disk drives, the diagnostics will indicate that no trouble was found with the PCI RAID adapter 110. The technician, in a prior art system, would be required to test each of the child devices, i.e. the disk drives, to isolate the problem. If there are many disk drives in a system, such diagnostic tests may take a very long time to complete.

With the present invention, when the diagnostic test attempts to place the child devices back into their original configured states, the faulty child device will fail to configure due to the fault in the device. The method of the present invention recognizes this fault and invokes a diagnostic application for the faulty child device, thus providing further problem determination. Diagnostics may then continue following the faulty device links to invoke additional tests for siblings and/or other child devices as necessary. Once the problem is isolated or it is determined that there is no need to test additional devices, the diagnostics may complete and present the results to the technician.

Thus, the automatic diagnostic procedures of the present invention eliminate the need for a technician to pick and choose which child devices to test and which diagnostic procedures to run on the child devices. In addition, the likelihood that an erroneous faulty device is identified and replaced is greatly reduced by the present invention since human intervention is not required. Moreover, the present invention steps through an entire "tree" of parent/child devices until the potential source of the fault is identified. In this way, the technician may be informed of a component, i.e. a child device, that may be replaced to solve the fault rather than requiring the technician to replace the entire parent device, i.e. an entire FRU.

Figure 2:
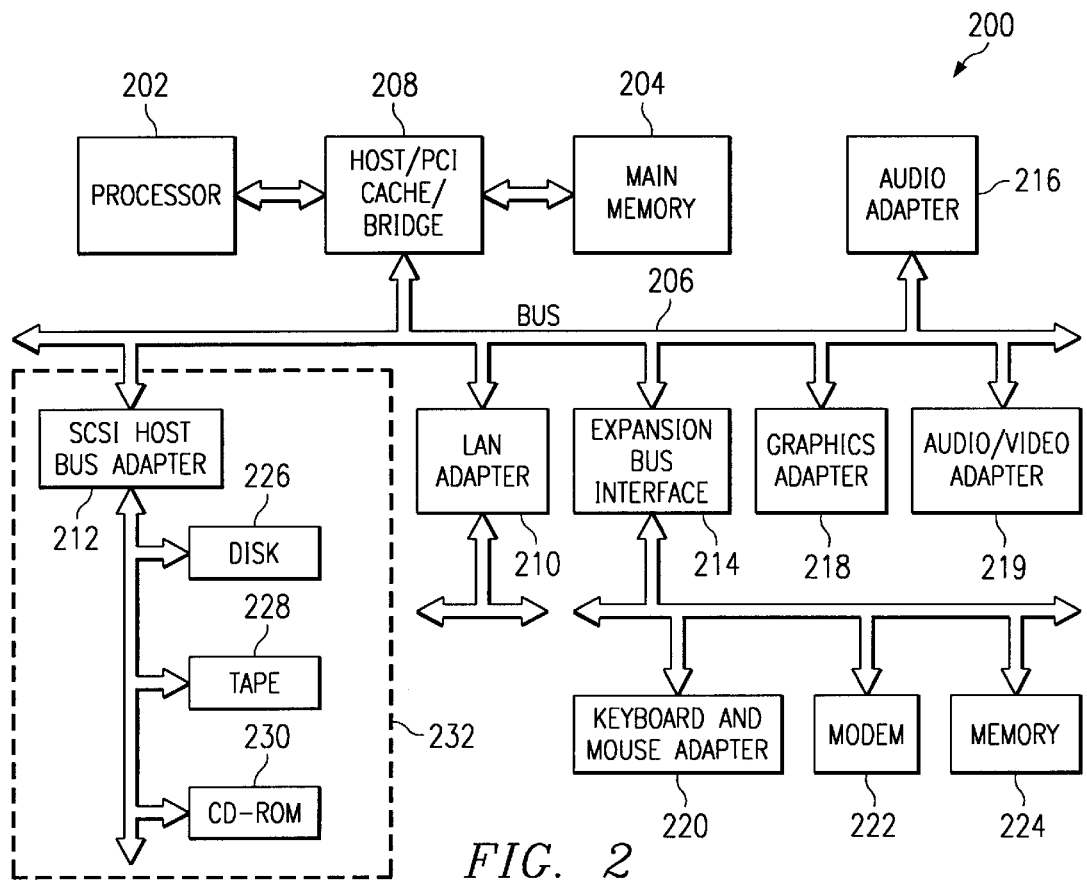
FIG. 2 is an exemplary block diagram of a data processing system in which the present invention may be implemented.

FIG. 2 is an exemplary block diagram of a data processing system in which the present invention may be implemented. Data processing system 200 is an example of a computer in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system, such as Java, may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like.

As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance. The processes of the present invention are performed by processor 202 using computer implemented instructions, which may be located in a memory such as, for example, main memory 204, memory 224, or in one or more peripheral devices 226–230.

Figure 3:
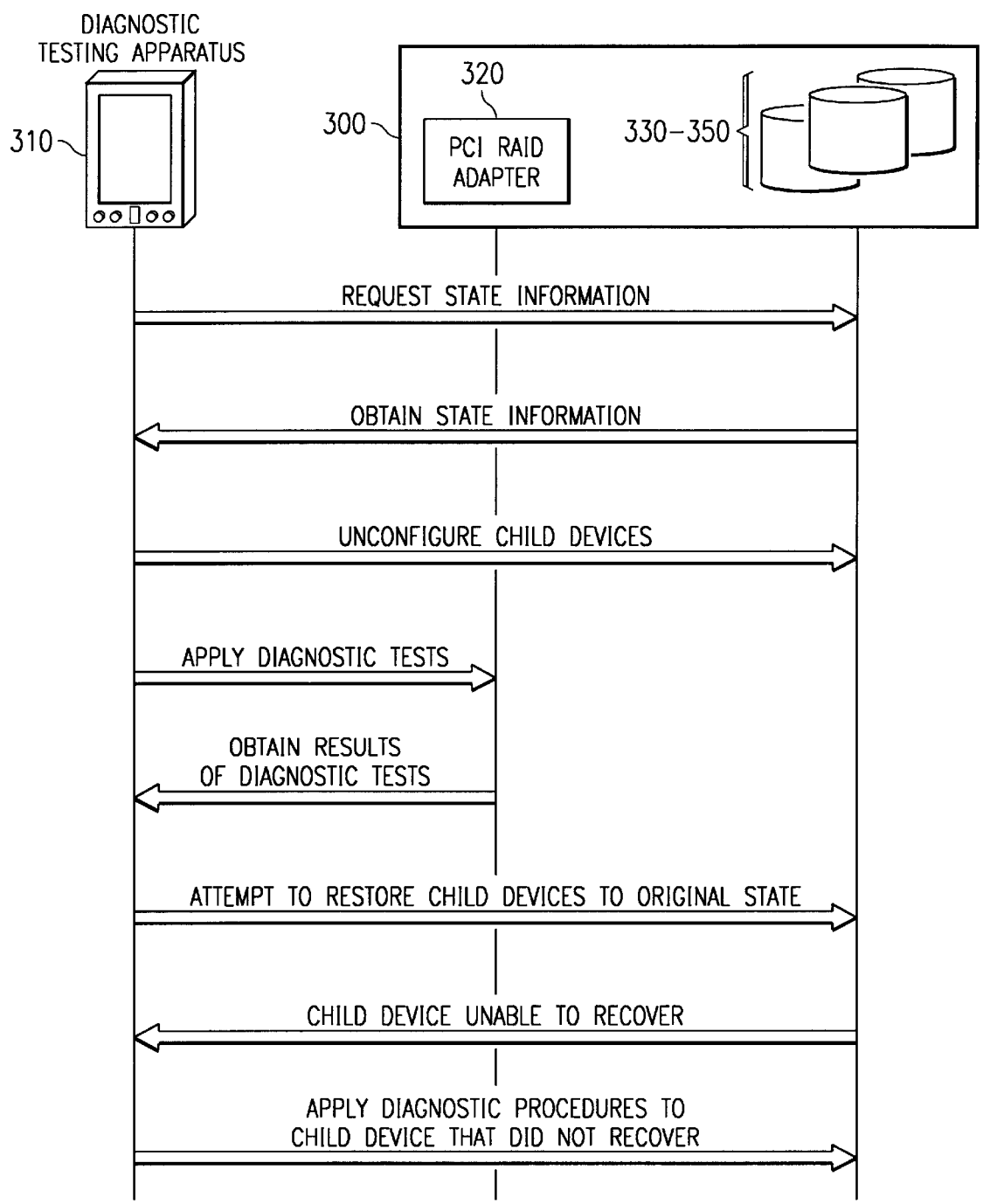
FIG. 3 is an exemplary diagram illustrating an application of the apparatus and method of the present invention to a system under test.

FIG. 3 is an exemplary diagram illustrating the application of the apparatus and method of the present invention to a parent/child device system in accordance with the present invention. As shown in FIG. 3, a problem is reported on the parent/child system and a technician is dispatched with the diagnostic testing apparatus 310, which may be a computer such as that shown in FIG. 2. The technician establishes a communication connection between the parent/child device system 300 and the diagnostic testing apparatus 310. This communication connection may be wired or wireless. For example, the communication connection may be established by an infrared link, a radio transmission channel, a serial or parallel cable connection, or the like.

The diagnostic testing apparatus 310 obtains state information for each of the child devices, disk drives 330–350, of the parent device, PCI RAID adapter 320, in the parent/child device system 300. Devices are configured by successfully loading the device driver for the device, or unconfigured by unloading the device driver after stopping all applications from using the device. State information is normally a flag that is created based off whether the driver is loaded or not.

This state information is stored into memory in association with device identifiers for each of the parent/child devices in the system 300. The parent and child devices are then unconfigured, i.e. their device drivers are unloaded after stopping all applications from using the devices, and the diagnostic tests for the PCI RAID adapter 320 are applied to the PCI RAID adapter 320.

The results of the diagnostic tests applied to the PCI RAID adapter 320 will indicate whether or not the PCI RAID adapter 320 is operating properly or not. If the PCI RAID adapter 320 is not operating properly, an error is reported to the technician performing the test on the PCI RAID adapter 320. If the PCI RAID adapter 320 is performing properly, attempts are made to restore the PCI RAID adapter's child device, i.e. the disk drives 330–350, to their original state.

If one of the disk drives 330–350 is faulty, the faulty disk drive, such as disk drive 340, may not reconfigure to its original state properly. The diagnostic testing apparatus 310 of the present invention identifies the child device as not having returned to its original state. This may be determined by comparing the current state of the disk drive with the original state information stored in memory.

When it is determined that the disk drive 340 has not returned to its original state, diagnostic procedures for the disk drive are applied in the same manner as described above with regard to the PCI RAID adapter 320. In other words, the disk drive 340 is now considered the parent device.

The diagnostic procedures or tests need not be in memory to execute. The diagnostic procedure may be stored in a hardfile or disk where the operating system resides, for example. There may be a table or database present that identifies which diagnostic procedures to load and invoke depending on the device that they will be applied to. This may be determined by reading a device id of the device which is to be tested.

This process is then repeated for any child devices of the disk drive 340 and is continued until a faulty device is detected. This process may also be performed simultaneously for a number of child devices should more than one child device not return to its original state after diagnostic tests are applied to its parent device.

Figure 4:
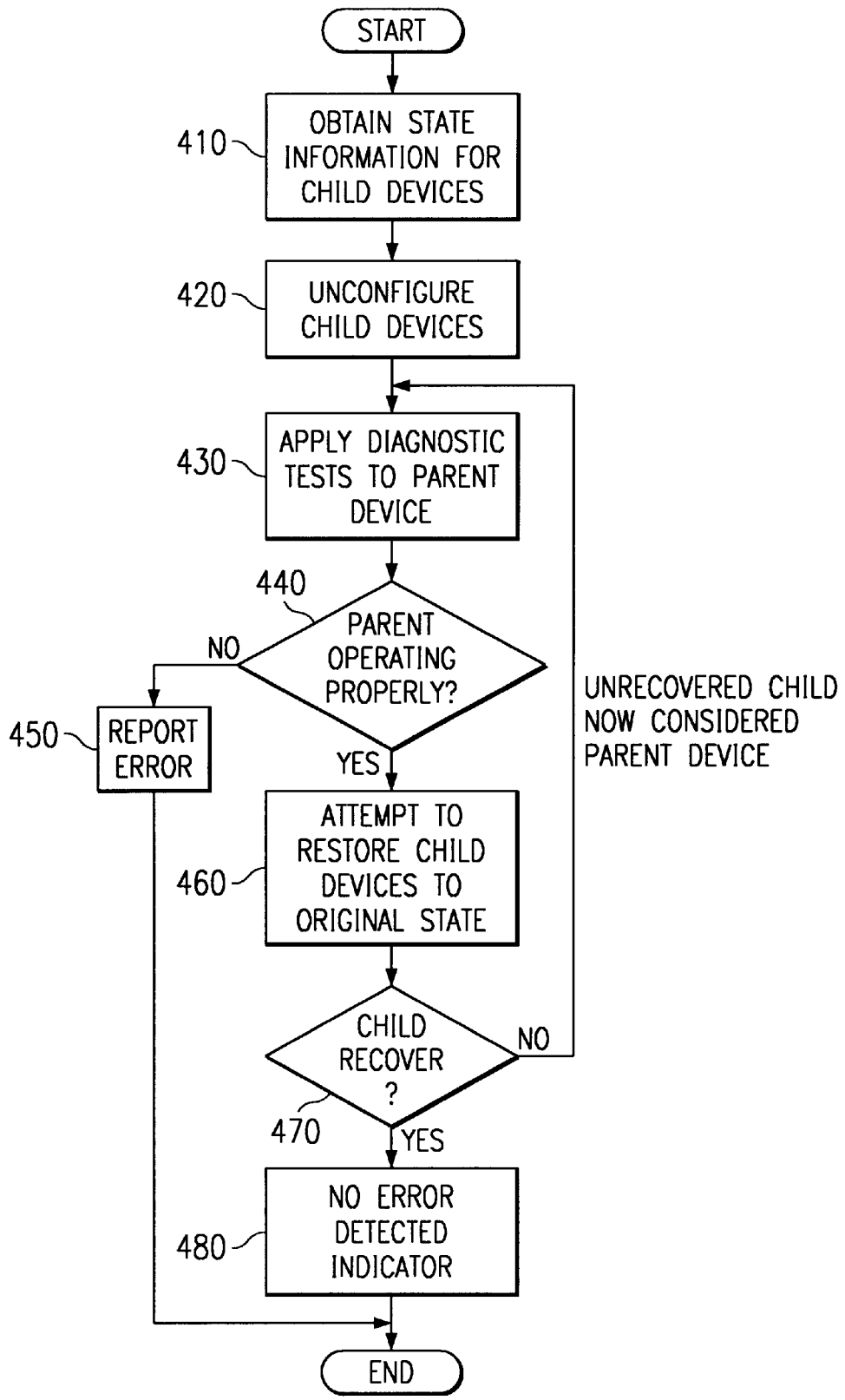
FIG. 4 is a flowchart outlining an exemplary operation of the present invention.

FIG. 4 is a flowchart outlining an exemplary operation of the present invention. As shown in FIG. 4, the operation starts with obtaining state information for the child devices of the parent device (step 410). The child devices are unconfigured (step 420) and diagnostic tests are applied to the parent device (step 430). A determination is made as to whether the parent device is operating properly (step 440). If not, the error is reported to the technician (step 450). The error may be reported in any appropriate manner including displaying error codes, error messages, outputting a voice message, activating a visual or audio indicator, or the like.

If the parent device is operating properly, attempts are made to restore the child devices to their original state (step 460). A determination is made as to whether a child did not recover, i.e. did not restore to its original state (step 470). If the child devices did recover, an indication is provided to the technician that no error was detected (step 480). The indication may be provided in the same manner as the error report described above.

If any of the child devices did not recover, the operation returns to step 430 where the child devices that did not recover are now considered to be the parent device. Then the process (steps 430–480) is repeated for each of the child devices that did not recover. The process ends when a child device is identified as being faulty and an error report is output (step 450). Alternatively, the process ends when all child devices are determined to have recovered appropriately.

Thus, the present invention provides an apparatus and method for automatically isolating a faulty device in a complex system. The apparatus and method of the present invention eliminate the need for a technician to have special knowledge of the underlying diagnostic tests being applied. Furthermore, the apparatus and method of the present invention eliminate the need for the technician to make guesses at which devices to test in an effort to isolate a system problem.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of diagnosing a fault in a system, comprising:
   applying a first diagnostic procedure to a parent device of the system;
   determining if the parent device is faulty; and
   automatically applying a second diagnostic procedure to one or more child devices if the parent device is not faulty.

2. The method of claim 1, further comprising:
   attempting to restore the one or more child devices to an original state based on results of the first diagnostic procedure, wherein the second diagnostic procedure is applied to a subset of the one or more child devices that do not return to the original state.

3. The method of claim 1, further comprising obtaining state information for the one or more child devices prior to applying the first diagnostic procedure to the parent device.

4. The method of claim 1, further comprising unconfiguring the one or more child devices prior to applying the first diagnostic procedure to the parent device.

5. The method of claim 4, wherein unconfiguring the one or more child devices includes stopping all applications from using the one or more child devices and unloading device drivers for the one or more child devices.

6. The method of claim 1, further comprising identifying the second diagnostic procedure based on a device identifier for the one or more child devices.

7. The method of claim 6, wherein identifying the second diagnostic procedure includes using one of a diagnostic procedure table or diagnostic procedure database to identify the second diagnostic procedure from a plurality of possible diagnostic procedures.

8. The method of claim 1, further comprising repeating the steps of applying a first diagnostic procedure to a parent device of the system, determining if the parent device is faulty, and applying a second diagnostic procedure to one or more child devices if the parent device is not faulty, wherein the one or more child devices in a prior iteration is considered a parent device for a subsequent iteration.

9. The method of claim 8, wherein the steps are repeated until a faulty device is identified.

10. The method of claim 1, wherein the parent device is a PCI RAID adapter and wherein the one or more child devices are disk drives.

11. The method of claim 1, wherein the method is performed by a personal digital assistant.

12. A computer program product in a computer readable medium for diagnosing a fault in a system, comprising:
    first instructions for applying a first diagnostic procedure to a parent device of the system;
    second instructions for determining if the parent device is faulty; and
    third instructions for automatically applying a second diagnostic procedure to one or more child devices if the parent device is not faulty.

13. The computer program product of claim 12, further comprising fourth instructions for attempting to restore the one or more child devices to an original state based on results of the first diagnostic procedure, wherein the second diagnostic procedure is applied to a subset of the one or more child devices that do not return to the original state.

14. The computer program product of claim 12, further comprising fourth instructions for obtaining state information for the one or more child devices prior to executing the first instructions.

15. The computer program product of claim 12, further comprising fourth instructions for unconfiguring the one or more child devices prior to executing the first instructions.

16. The computer program product of claim 15, wherein the fourth instructions for unconfiguring the one or more child devices include instructions for stopping all applications from using the one or more child devices and instructions for unloading device drivers for the one or more child devices.

17. The computer program product of claim 12, further comprising fourth instructions for identifying the second diagnostic procedure based on a device identifier of the one or more child devices.

18. The computer program product of claim 17, wherein the fourth instructions include instructions for using one of a diagnostic procedure table or diagnostic procedure database to identify the second diagnostic procedure from a plurality of possible diagnostic procedures.

19. The computer program product of claim 12, further comprising fourth instructions for repeatedly executing the first, second and third instructions, wherein the one or more child devices in a prior iteration is considered a parent device for a subsequent iteration.

20. The computer program product of claim 19, wherein the fourth instructions include instructions for repeatedly executing the first, second and third instructions until a faulty device is identified.

21. The computer program product of claim 12, wherein the parent device is a PCI RAID adapter and wherein the one or more child devices are disk drives.

22. An apparatus for diagnosing a fault in a system, comprising:
    first means for applying a first diagnostic procedure to a parent device of the system;
    second means for determining if the parent device is faulty; and
    third means for automatically applying a second diagnostic procedure to one or more child devices if the parent device is not faulty.

23. The apparatus of claim 22, further comprising fourth means for attempting to restore one or more child devices to an original state based on results of the first diagnostic procedure.

24. The apparatus of claim 22, further comprising fourth means for obtaining state information for the one or more child devices prior to applying the first diagnostic procedure to the parent device.

25. The apparatus of claim 22, further comprising fourth means for unconfiguring the one or more child devices prior to applying the first diagnostic procedure to the parent device.

26. The apparatus of claim 25, wherein the fourth means for unconfiguring the one or more child devices includes means for stopping all applications from using the one or more child devices and means for unloading device drivers for the one or more child devices.

27. The apparatus of claim 21, further comprising fourth means for identifying the second diagnostic procedure based on a device identifier.

28. The apparatus of claim 27, wherein the fourth means for identifying the second diagnostic procedure includes means for using one of a diagnostic procedure table or diagnostic procedure database to identify the second diagnostic procedure from a plurality of possible diagnostic procedures.

29. The apparatus of claim 22, wherein the first, second and third means repeatedly operate until a faulty device is identified, and wherein the one or more child devices in a prior iteration is considered a parent device for a subsequent iteration.

30. The apparatus of claim 22, wherein the parent device is a PCI RAID adapter and wherein the one or more child devices are disk drives.

31. An apparatus of diagnosing a fault in a system, comprising:
   a diagnostic testing tool; and
   a communications interface coupled to the diagnostic tool, wherein the diagnostic testing tool applies a first diagnostic procedure to a parent device of the system via the communications interface, attempts to restore one or more child devices to an original state based on results of the first diagnostic procedure, and applies a second diagnostic procedure to a subset of the one or more child devices, via the communications interface, if the subset does not return to the original state.

* * * * *

UNITED STATES PATENT AND TRADEMARK OFFICE
CERTIFICATE OF CORRECTION

PATENT NO. : 6,725,405 B2
DATED : April 20, 2004
INVENTOR(S) : Batten et al.

It is certified that error appears in the above-identified patent and that said Letters Patent is hereby corrected as shown below:

Column 8,
Line 65, delete "of claim 21," and insert -- of claim 22, --.

Signed and Sealed this

Twenty-fifth Day of October, 2005

JON W. DUDAS
*Director of the United States Patent and Trademark Office*